United States Patent [19]
Klein et al.

[11] Patent Number: 5,750,163
[45] Date of Patent: May 12, 1998

[54] HYDRAULIC MOULD CLOSURE DEVICE FOR AN INJECTION MOULDING MACHINE

[75] Inventors: Heinz Hermann Klein, Rossbach; Werner Filippi, Bonefeld, both of Germany

[73] Assignee: Dr. Boy GmbH, Germany

[21] Appl. No.: 667,397

[22] Filed: Jun. 21, 1996

[51] Int. Cl.$^6$ ................................................. B29C 45/67
[52] U.S. Cl. ........................ 425/590; 425/589; 425/451.2
[58] Field of Search .................................. 425/589, 590, 425/595, 450.1, 451.2, 451.9

[56] References Cited

U.S. PATENT DOCUMENTS

| | | | |
|---|---|---|---|
| 4,249,880 | 2/1981 | Wohlrab | 425/590 |
| 4,325,287 | 4/1982 | Hehl | 425/590 |
| 4,380,427 | 4/1983 | Hehl | 425/590 |
| 4,443,179 | 4/1984 | Wohlrab | 425/590 |
| 4,846,664 | 7/1989 | Hehl | 425/589 |
| 4,981,426 | 1/1991 | Katashi | 425/590 |
| 5,061,175 | 10/1991 | Iwamoto | 425/589 |
| 5,336,462 | 8/1994 | Wohlrab | 425/590 |

*Primary Examiner*—James P. Mackey
*Attorney, Agent, or Firm*—Blakely Sokoloff Taylor & Zafman

[57] ABSTRACT

The hydraulic mould closure device for an injection moulding machine has a pressure convertor, whose high pressure piston extends into a passage leading to the pressure side of the closure piston and closes it, when producing the closure pressure. Formed in the low pressure piston is an actuating cylinder into which an actuating piston extends. The actuating piston is connectable to the hydraulic tank and to the hydraulic pump. Adjacent to the low pressure cylinder of the pressure convertor there is a space whose diameter is larger than that of the low pressure cylinder. The actuating piston also has lateral openings which move out of the actuating cylinder as soon as the high pressure piston moves into the high pressure cylinder. The piston element of the pressure convertor is moved very rapidly out of the rest position into its active position so that operation occurs with reduced control times.

4 Claims, 7 Drawing Sheets

HYDRAULIC MOULD CLOSURE DEVICE FOR AN INJECTION MOULDING MACHINE

BACKGROUND OF THE INVENTION

I. Field of the Invention

The invention relates to a hydraulic mould closure device for an injection moulding machine, particularly for processing plastics material, including at least one closure piston operating in a closure cylinder housing, a hydraulic tank, a hydraulic pump, a passage which leads to the pressure side of the closure piston and is connectable to the hydraulic tank, and a pressure convertor which is connected to the passage and in whose housing a piston element constituting a high pressure piston and a low pressure piston operates, the high pressure piston extending into the passage constituting a high pressure cylinder as a sealing valve element during production of the closure pressure and the low pressure piston cooperating with a low pressure cylinder.

II. Description of the Prior Art

Such a device is known from DE 2834895 C2. During the closure movement of the closure piston the space behind the closure piston fills with hydraulic fluid. The hydraulic fluid flows through the passage which connects the pressure side of the closure piston to the hydraulic tank. After completion of the closure movement, the pressure convertor is actuated by the application of pressure to the low pressure piston. The high pressure piston thus moves into the high pressure cylinder which is constituted by the passage leading from the hydraulic tank to the pressure side of the closure piston. The high pressure piston of the pressure convertor closes this passage and creates the actual closure pressure behind the closure cylinder.

After completion of the injection cycle, the pressure convertor is again actuated, but in the opposite direction. The passage leading to the hydraulic tank is thus opened again, whereafter the closure piston can push the hydraulic fluid into the hydraulic tank on its return stroke. The known actuator is characterised by very favourable flow conditions between the hydraulic tank and the pressure side of the closure piston with a simple construction and control. However, the speed of control of the known actuator appears to be capable of improvement.

SUMMARY OF THE INVENTION

Accordingly, it is the object of the invention to provide a hydraulic mould closure device of the type referred to above which operates with reduced control times.

In order to solve this object the mould closure device in accordance with the invention is characterised in that the low pressure piston of the pressure convertor constitutes an actuating cylinder on the pressure side into which a tubular actuating piston, which may be connected to the hydraulic pump and to the hydraulic tank, extends, that adjacent to the low pressure cylinder on the pressure side there is a space with a broadened diameter to receive the low pressure piston when the high pressure cylinder is open, the spacing of the low pressure piston from the low pressure cylinder in this position corresponding at most to the travel of the high pressure piston until it sealingly enters into the high pressure cylinder, and that the tubular actuating piston has lateral openings which move out of the actuating cylinder as soon as the high pressure piston enters into the high pressure cylinder.

This construction has the substantial advantage that the piston element of the pressure convertor can be moved at higher speed out of its rest position into that position in which the creation of the closure pressure begins, i.e. in which the high pressure piston sealingly enters into the high pressure cylinder.

At the same time or slightly earlier the low pressure piston also enters into the low pressure cylinder. Up to this time fluid can flow around the low pressure piston to its pressure side so that the space with the broadened diameter is automatically filled. As soon as the high pressure piston moves into the high pressure cylinder, the lateral openings in the actuating piston on the pressure side of the low pressure piston are exposed so that the creation of the closure pressure can begin.

The increase in the control speed is achieved without additional control expense and with constructionally simple means.

If the piston element of the pressure convertor is situated in a position in which the high pressure cylinder is open, neither of the two cylinders engages its cylinder wall. The guiding of the piston element is taken over by the actuating piston extending into its actuating cylinder. In order to improve the guiding function, it is proposed in a further embodiment of the invention that the high pressure piston of the pressure convertor carries an axial peg which slides in a housing guide. The piston element of the pressure convertor is reliably guided in this manner at both ends.

It can be advantageous if the housing guide for the axial peg is constructed as a cylinder and is connectable to the hydraulic tank and the hydraulic pump. After termination of an injection process, this cylinder is connected to the system pressure whereby the piston element of the pressure convertor moves into its open position. This embodiment is advantageous if the pressure convertor operates in a system in which the hydraulic fluid is sucked in during the closing movement of the closure piston into the pressure space behind the latter. After termination of an injection process this space and thus also the pressure side of the high pressure piston of the pressure convertor become instantly depressurised as soon as the high pressure piston has moved slightly out of the high pressure cylinder. An automatic return of the piston element of the pressure convertor would thus occur only to a slight extent without the cylinder for the axial peg. The cylinder and axial peg ensure that the high pressure cylinder of the pressure convertor is completely open and that the subsequent suction stroke can thus occur under optimal flow conditions.

The flow convertor is, however, also usable in differential-circulation systems for which it is proposed in a further embodiment of the invention that the passage leading to the pressure side of the closure piston is connected, when the high pressure cylinder of the pressure convertor is open, to a passage which leads to the side of the closure piston opposite to the pressure side. This passage is subjected to the system pressure to achieve the necessary closure piston movements. Thus if the tubular actuating piston of the pressure convertor is connected to the hydraulic tank, a differential pressure acts on the piston element which permits the piston element to move into the completely open position.

BRIEF DESCRIPTION OF THE DRAWINGS

The invention will be described below in more detail with reference to preferred exemplary embodiments in conjunction with the accompanying drawings, in which.

DESCRIPTION OF THE PREFERRED EMBODIMENTS

Figure 1:
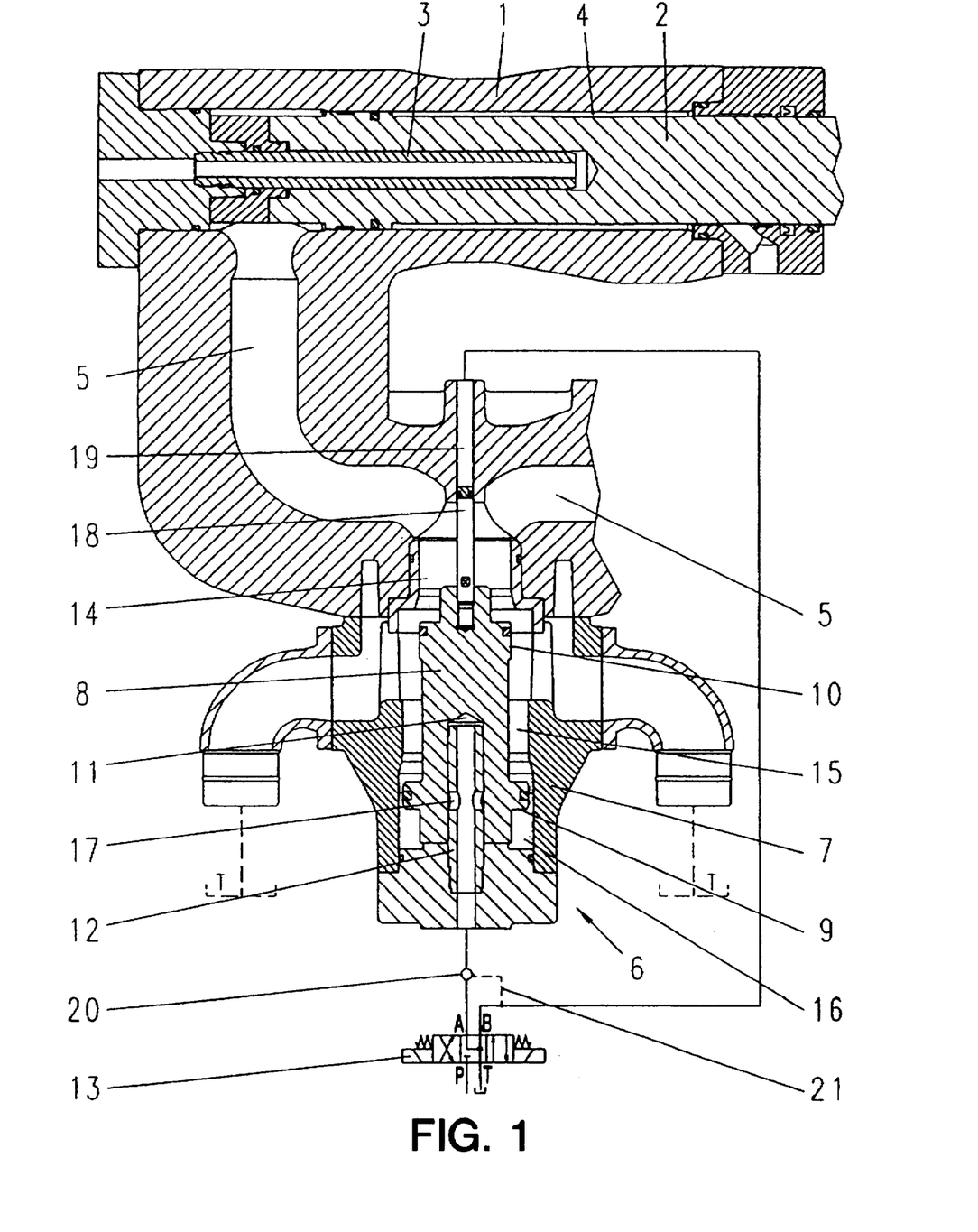
FIG. 1 is a schematic sectional view of a first embodiment.
Figure 2:
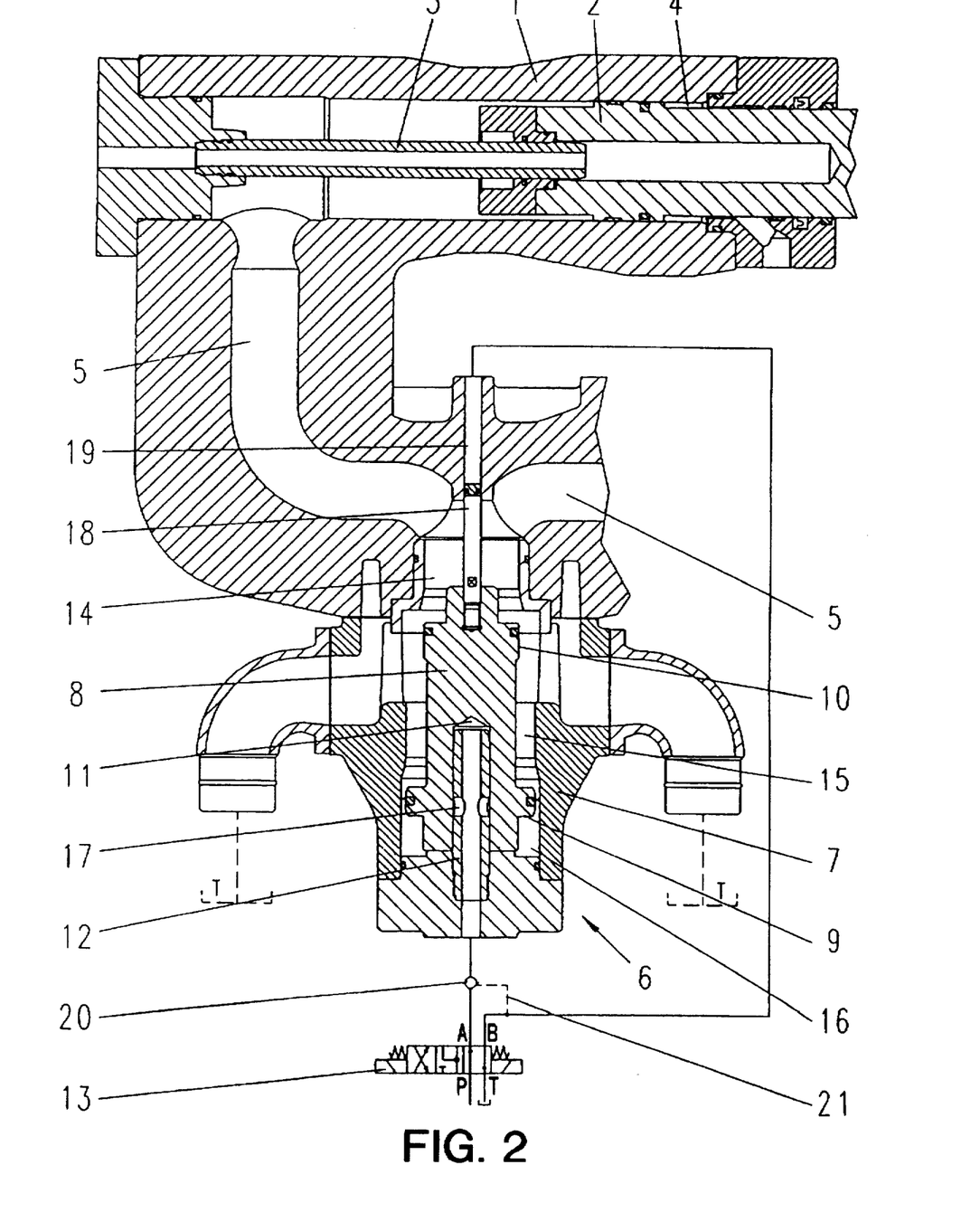
FIG. 2 shows the embodiment of FIG. 1 in a second switched position.
Figure 3:
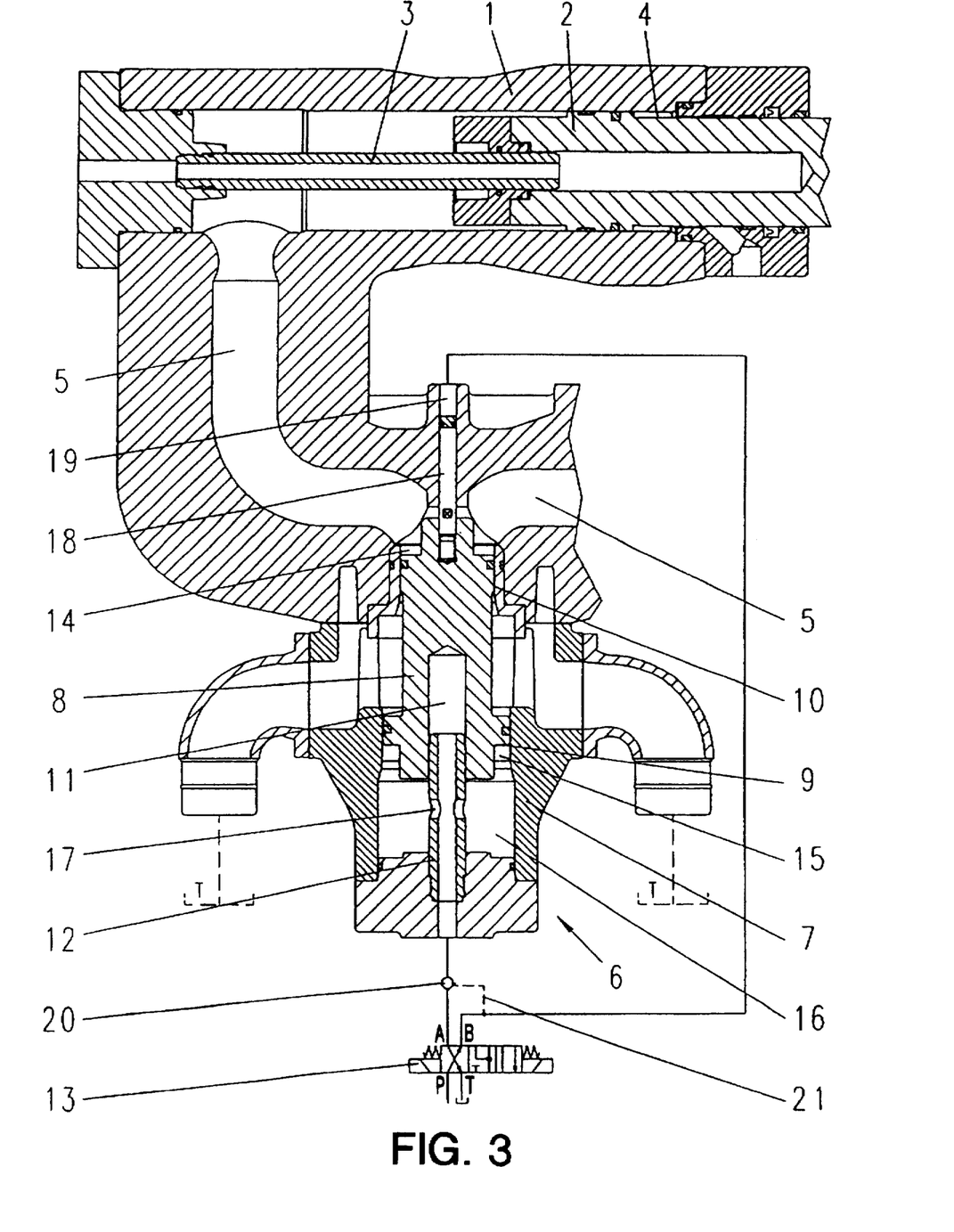
FIG. 3 shows the embodiment of FIG. 1 in a third switched position.

The hydraulic mould closure device of FIGS. 1 to 3 is a component of a plastic injection moulding machine and serves to move the movable mould halves back and forth between their open position, the closure pressure being created in the closed position. It has a closure cylinder housing 1 in which a closure piston 2 operates. The latter is situated in the open position in FIG. 1 and in the closed position in FIGS. 2 and 3. The movement out of the open position into the closed position is effected by an actuating piston 3 whilst the system pressure is applied to an annular space 4 to produce movement in the opposite direction.

If the closure piston 2 moves out of its position shown in FIG. 1 into the position shown in FIGS. 2 and 3 it sucks hydraulic fluid out of a schematically indicated hydraulic tank T via a passage 5. FIG. 2 shows the arrangement after completion of the closure movement. The creation of the closure pressure is now performed, namely with the actuation of a pressure convertor 6. The pressure convertor 6 has a housing 7 in which a piston element 8 operates. The latter constitutes a low pressure piston 9 and a high pressure piston 10. The piston element 8 is provided on the side of the low pressure piston 9 with an actuating cylinder 11 into which a tubular actuating piston 12 extends.

If the closure piston 2 has reached the position shown in FIG. 2, a valve 13 is switched out of the position shown in FIG. 1, in which the pressure convertor 6 is unpressurised, into the position shown in FIG. 2. The actuating piston 12 is thus connected to a hydraulic pump P, which is shown only symbolically. The piston element 8 thus moves out of the position shown in FIG. 2 into the position shown in FIG. 3. During the course of this movement the high pressure piston 10 of the piston element moves into a high pressure cylinder 14, which is constituted by the passage 5. The high pressure piston 10 closes the high pressure cylinder 14 and thus the passage 5. As it continues to move it creates the closure pressure.

This occurs due to the fact that as the piston element 8 moves its low pressure piston 9 moves into a low pressure cylinder 15 which is defined by the housing 7 of the pressure convertor 6. Prior to this, the low pressure piston 9 moves through a space 16 whose diameter is greater than that of the low pressure cylinder 15. Fluid thus flows around the low pressure piston 9 so that reduced pressure cannot occur in the space 16. The dimensions are so selected that the entry of the low pressure piston 9 into the low pressure cylinder 15 can under no circumstances occur later than the entry of the high pressure piston 10 into the high pressure cylinder 14.

The actuating piston 12 of the pressure convertor 6 has lateral openings 17 which are exposed as soon as the low pressure piston 9 enters into the low pressure cylinder 15. The low pressure piston 9 is thus connected in this manner to the system pressure on the pressure side so that the pressure convertor 6 can perform its function.

The arrangement is simple as regards its construction and control. Its principal advantage resides in that it can operate with very short control times since the piston element 8 of the pressure convertor 6 rapidly reaches its active position. This is of crucial significance because the travel of the piston element 8 may not be selected to be too small in order to maintain the flow conditions in the channel 5 as low in losses as possible.

For as long as the pistons 9 and 10 of the piston element 8 have not yet entered their associated cylinder 15 and 14, respectively, the piston element 8 is guided by the tubular actuating piston 12. An additional guiding function is effected by a peg 18 which is screwed axially into the piston element 8 on the high pressure side and slides in a housing guide 19. The housing guide 19 is constructed as a cylinder, the peg 18 operating as a piston and effecting the return stroke of the piston element 8.

The closure pressure is maintained during the injection process. This is effected by a non-return valve 20 which is arranged between the actuating piston 12 of the pressure convertor 6 and the valve 13.

FIG. 3 shows the situation directly after termination of the injection process, the valve 13 having been switched into that position which effects the deactivation of the pressure convertor 6. The hydraulic pump P is connected to the housing guide 19 so that the peg 18 of the piston element 8 is subjected to the system pressure. The system pressure acts at the same time via a control line 21 on the non-return valve 20 and opens the latter. The space 16 on the pressure side of the low pressure piston 9 is thus connected to the hydraulic tank T and is accordingly depressurised. The peg 18 thus pushes the piston element 8 into the rest position, whereby the passage 5 is opened. During the return stroke of the closure piston 2 the hydraulic fluid situated on the pressure side can thus flow away unimpeded into the tank.

Whilst the device shown in FIGS. 1 to 3 sucks the hydraulic fluid on the pressure side behind the closure piston 2, the device shown in FIGS. 4 to 7 operates with a differential-circulating system. Furthermore, the closure piston pulls the movable mould half against the fixed mould half whilst in FIGS. 1 to 3 the movable mould half is pushed against the fixed mould half. The following description of FIGS. 4 to 7 refers only to the differences.

In FIGS. 4 to 7, the passage 5 is in communication via the pressure convertor 6 with a passage 22 which makes overflow of the hydraulic fluid from one side of the closure piston 2 to the other possible and is also connectable to the hydraulic tank T and to the hydraulic pump P. Furthermore, an extension 23 of the closure piston 2 projects into a cylinder space 24. In addition to the valve 13, a further valve 25 is provided in order to be able to perform the necessary switching steps for the control.

Figure 4:
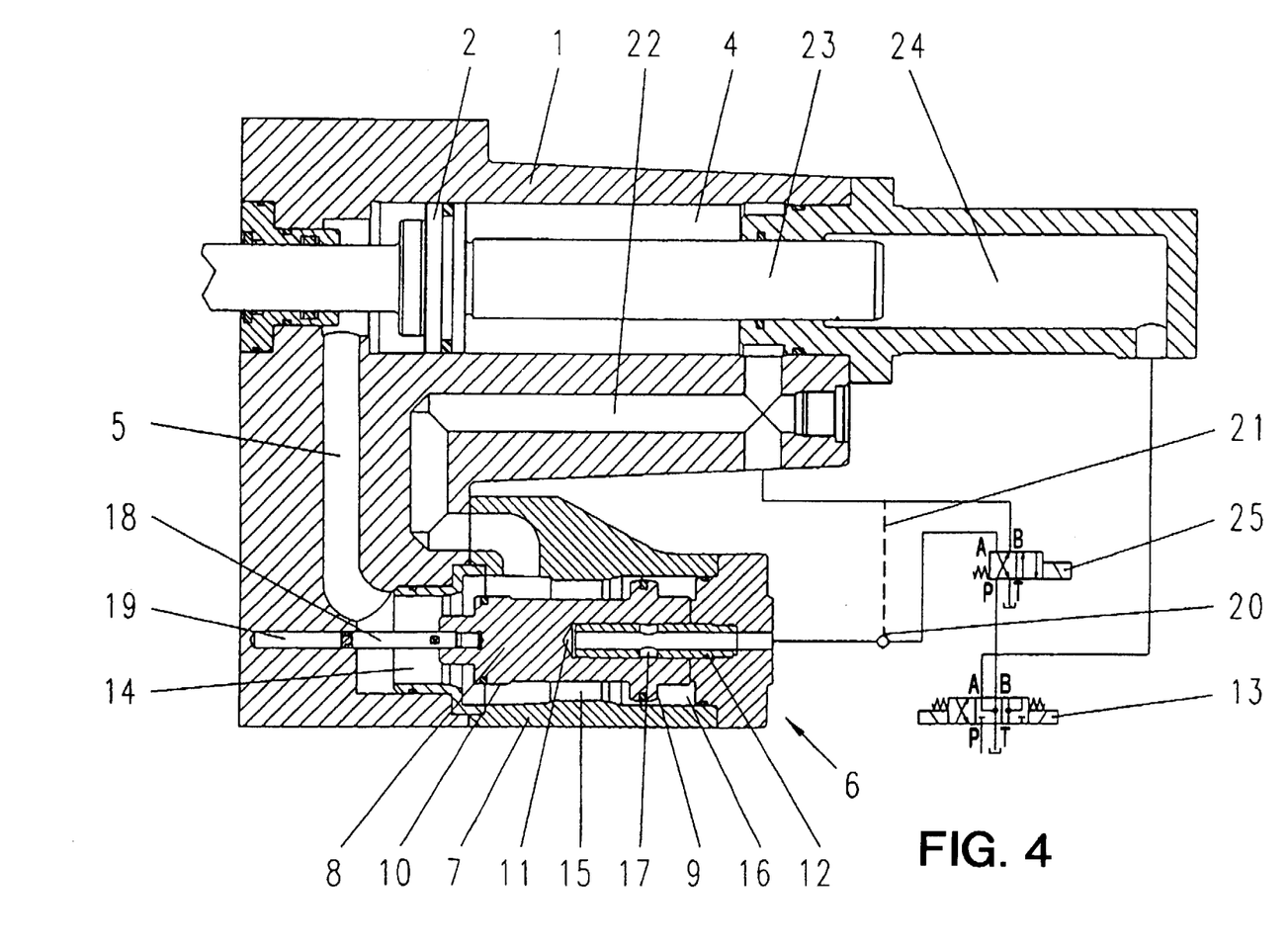
FIG. 4 is a schematic sectional view of a second embodiment.
Figure 5:
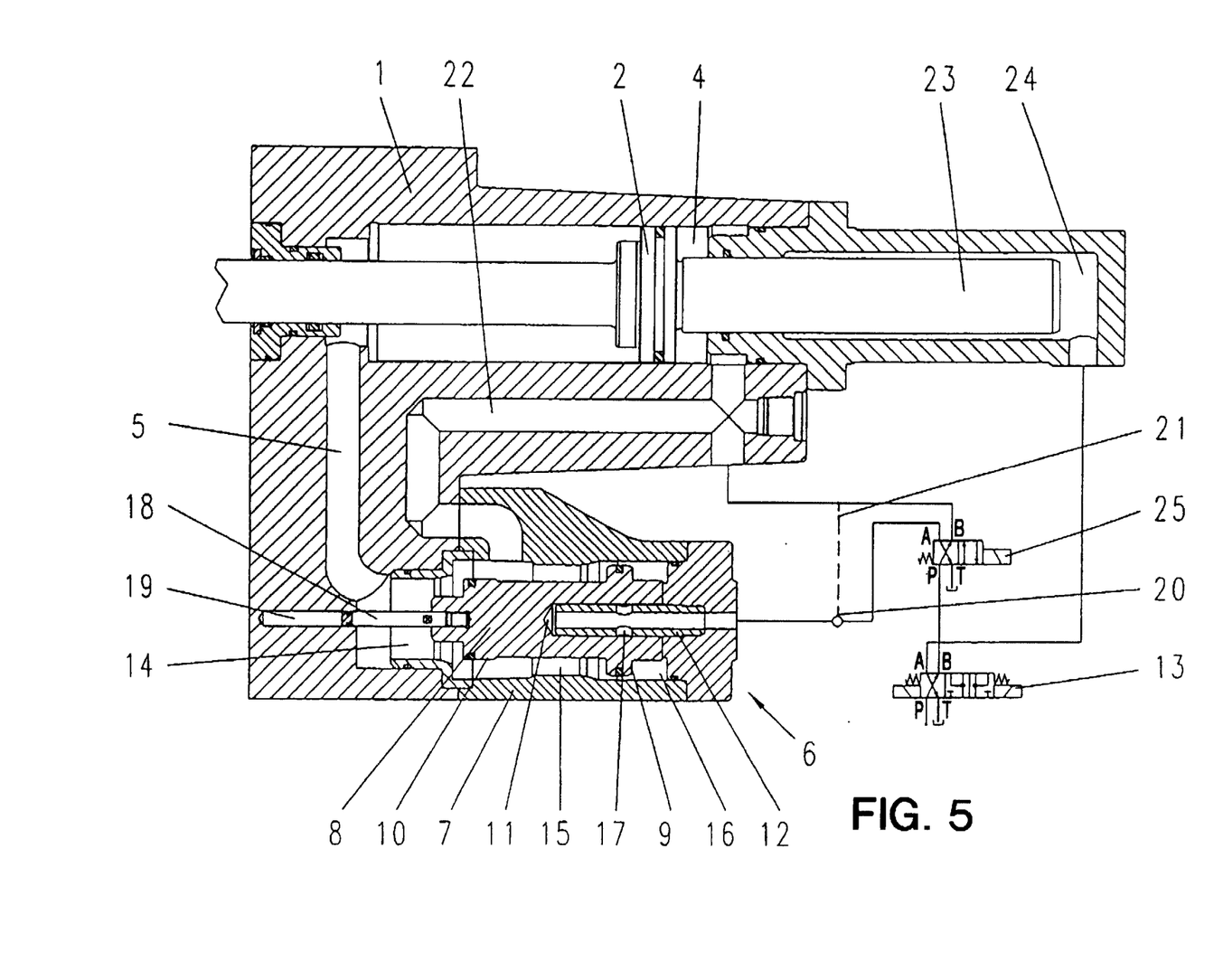
FIG. 5 shows the embodiment of FIG. 4 in a second switched position.

FIG. 4 shows the closure piston 2 when the mould is open. The pressure convertor 6 adopts its open position and the valves 13 and 25 maintain the system unpressurised. After switching the valve 13 over into the position shown in FIG. 5, the passages 5 and 22 were subjected to the system pressure, whereafter the closure piston 2 has moved under the action of the differential pressures resulting from the surface ratios to the right and has closed the mould. The hydraulic fluid has thus overflowed through the passages 5 and 22 to the pressure side of the closure piston 2.

Figure 6:
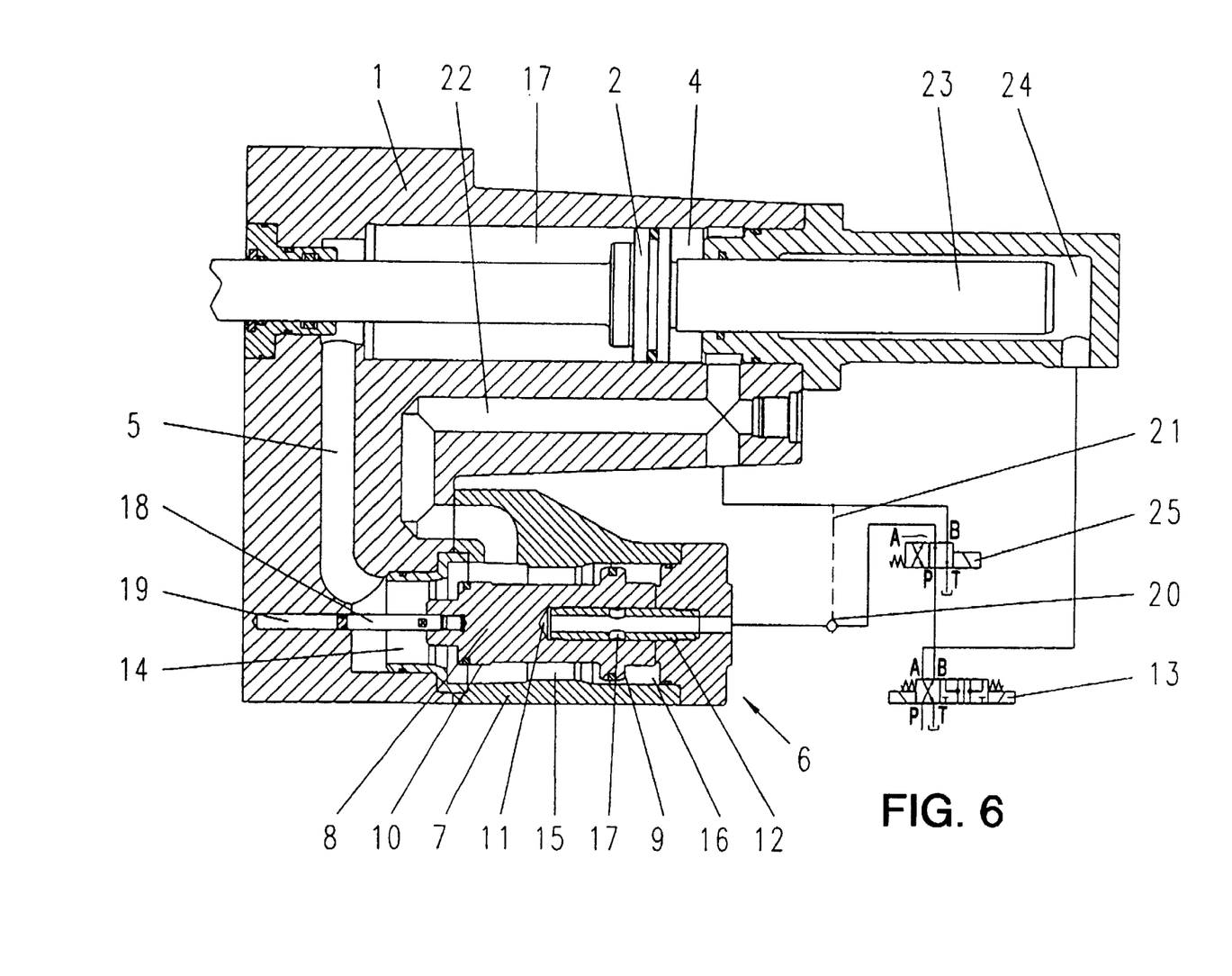
FIG. 6 shows the embodiment of FIG. 4 in a third switched position.

By switching the valve 25 over into the position shown in FIG. 6, the production of the closure pressure is initiated, i.e. the actuating piston 12 of the pressure convertor 6 is acted upon by the system pressure.

Figure 7:
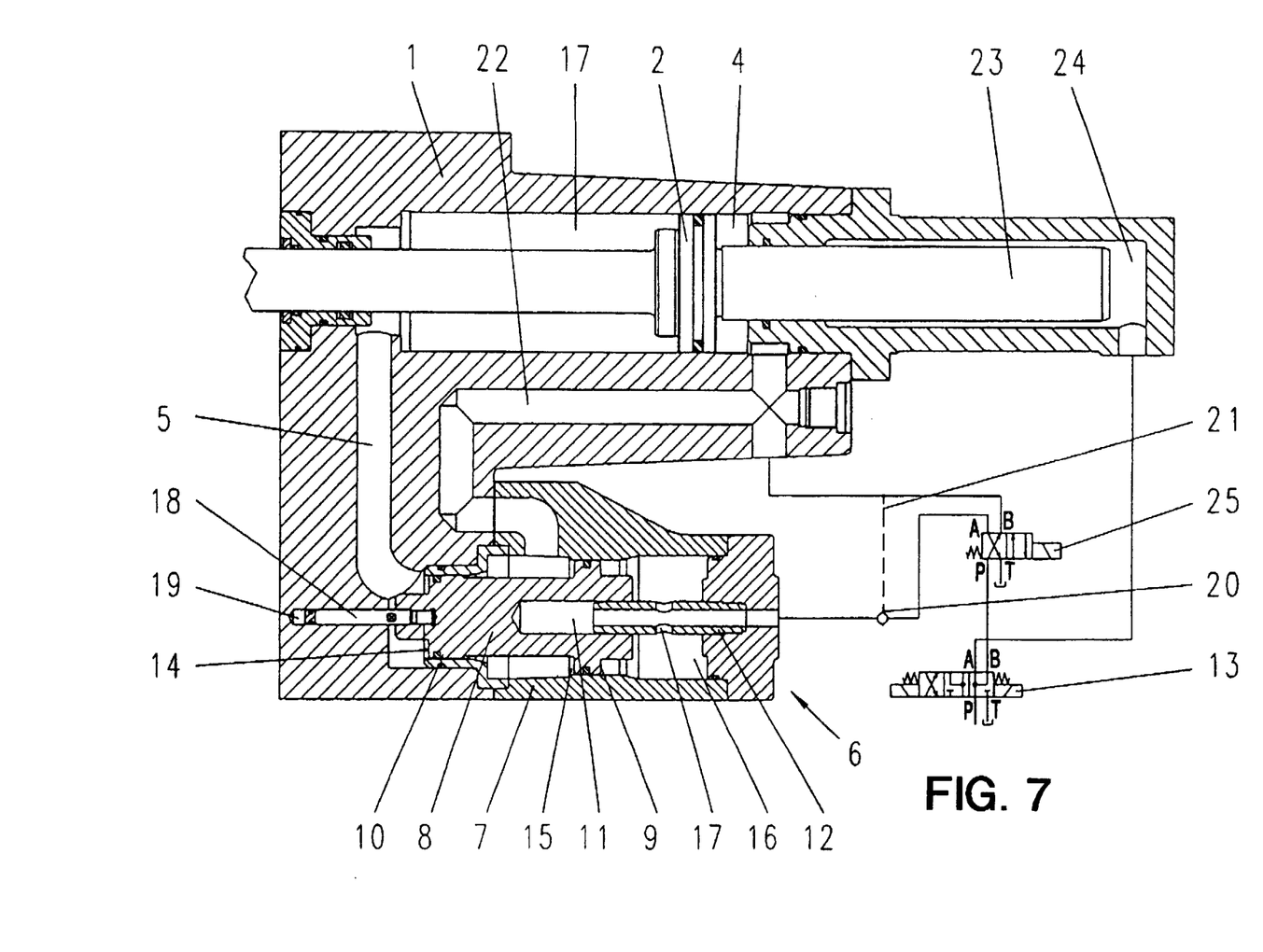
FIG. 7 shows the embodiment of FIG. 4 in a fourth switched position.

FIG. 7 shows the arrangement after termination of the injection process. The valves 13 and 25 have been switched over so that the return movement of both the piston element 8 of the pressure convertor 6 and also of the closure piston 2 can begin. The system pressure acts both on the passage 22 and also on the cylinder space 24. Furthermore, the non-return valve 20 has opened so that the space 16 behind the low pressure piston 9 of the pressure convertor 6 is depressurised. The return movement of the piston element 8 of the pressure convertor 6 is effected by the pressure acting on the low pressure piston 9 via the passage 22. The peg 18 of the piston element 8 fulfils merely a guiding function in the present case.

As soon as the pressure convertor 6 has exposed the connection between the passage 5 and the passage 22, the closure piston 2 moves back into the position illustrated in FIG. 4.

There are of course possibilities for modification within the scope of the invention. Thus in the embodiment of FIGS. 4 to 7, the peg 18 on the piston element 8 can be omitted if the guiding by the actuating piston 12 is reliably to position the piston element 8 during its free travel. The other details shown in the exemplary embodiments may also be altered. For instance, the valves 13 and 25 can be integrated into a unit.

We claim:

1. Hydraulic mould closure device for an injection moulding machine for processing plastic materials, the mould closure device comprising:

a closure cylinder housing, at least one closure piston which operates in the closure cylinder housing and has a pressure side, a hydraulic tank, a hydraulic pump, a passage which leads to the pressure side of the closure piston and is connectable to the hydraulic tank, and a pressure convertor which is connected to the passage;

a pressure convertor including, a pressure convertor housing, a piston element which performs a reciprocating movement in the pressure convertor housing between an open position and a closed position and constitutes a high pressure piston and a low pressure piston, the low pressure piston having a pressure side, a low pressure cylinder for the low pressure piston, the low pressure cylinder defining a diameter, an actuating cylinder which is formed in the low pressure piston and is open on the pressure side of the low pressure piston, a tubular actuating piston which extends into the actuating cylinder and is connectable to the hydraulic pump and to the hydraulic tank, the tubular actuating piston having lateral openings, a space which is adjacent to the low pressure cylinder on the pressure side of the low pressure piston and defines a diameter which is greater than the diameter of the low pressure cylinder, the space forming a transition to the low pressure cylinder;

wherein the movement of the piston element of the pressure convertor to the closed position the high pressure piston sealingly enters into the passage leading to the pressure side of the closure piston and thus creates a closure pressure for the closure piston, the passage constituting a high pressure cylinder for the high pressure piston and causing the low pressure piston of the piston element to expose the lateral opening in the actuating piston; and wherein in the open position of the piston element of the pressure convertor the passage leading to the pressure side of the closure piston is open and the low pressure piston of the piston element has entered into the space adjacent to the low pressure cylinder, the spacing of the low pressure piston from the transition between the space and the low pressure cylinder corresponding at most to the stroke of the piston element.

2. Mould closure device as claimed in claim 1, wherein the high pressure piston of the pressure convertor carries an axial peg which slides in a housing guide.

3. Mould closure device as claimed in claim 2, wherein the housing guide for the axial peg is constructed as a cylinder and is connectable to the hydraulic tank and the hydraulic pump.

4. Mould closure device as claimed in claim 1 or 2, wherein the passage leading to the pressure side of the closure piston is connected, when the piston element of the pressure convertor adopts its open position, to a passage which leads to the side of the closure piston opposed to the pressure side.

* * * * *